(12) United States Patent
Ibaraki

(10) Patent No.: US 7,056,251 B2
(45) Date of Patent: Jun. 6, 2006

(54) HYBRID VEHICLE

(75) Inventor: Shigeru Ibaraki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/398,168

(22) PCT Filed: Oct. 5, 2001

(86) PCT No.: PCT/JP01/08823

§ 371 (c)(1),
(2), (4) Date: Oct. 30, 2003

(87) PCT Pub. No.: WO02/31334

PCT Pub. Date: Apr. 18, 2002

(65) Prior Publication Data

US 2004/0063535 A1 Apr. 1, 2004

(30) Foreign Application Priority Data

Oct. 10, 2000 (JP) .............................. 2000-314435

(51) Int. Cl.
*B60K 3/04* (2006.01)
*F16H 3/72* (2006.01)
(52) U.S. Cl. .............................. 475/5; 180/304; 60/618
(58) Field of Classification Search ........ 180/301–304, 180/62.5–65.4, 65.8; 60/618; 475/475, 475/5
See application file for complete search history.

(56) References Cited

U.S. PATENT DOCUMENTS

| | | | | |
|---|---|---|---|---|
| 4,405,029 A | * | 9/1983 | Hunt | 180/65.2 |
| 5,680,764 A | * | 10/1997 | Viteri | 60/716 |
| 5,927,415 A | * | 7/1999 | Ibaraki et al. | 180/65.2 |
| 6,202,782 B1 | * | 3/2001 | Hatanaka | 180/301 |
| 6,450,283 B1 | * | 9/2002 | Taggett | 180/304 |

FOREIGN PATENT DOCUMENTS

| | | |
|---|---|---|
| JP | 56-101012 A | 8/1981 |
| JP | 59-221409 A | 12/1984 |
| JP | 5-111101 A | 4/1993 |
| JP | 5-340241 A | 12/1993 |
| JP | 11-343864 | * 12/1999 |

* cited by examiner

*Primary Examiner*—Ha Ho
(74) *Attorney, Agent, or Firm*—Birch Stewart Kolasch & Birch LLP

(57) ABSTRACT

A Rankine cycle system for recovering a heat energy of an exhaust gas is mounted on a hybrid vehicle including an internal combustion engine as a drive source for the vehicle and an electric generator motor. An output from the Rankine cycle system is input to a transmission and used to assist in a driving force from the internal combustion engine, or converted into an electric power and used to charge a battery. During acceleration and cruising of the vehicle, the heat energy of the exhaust gas is recovered by the Rankine cycle system, and during deceleration of the vehicle, a kinetic energy of a vehicle body is recovered as a regenerative electric power for the electric generator motor, thereby reducing the amount of fuel consumed in the internal combustion engine. Thus, in any operational state, vehicle energy efficiency is enhanced, thus reducing the fuel consumed.

9 Claims, 14 Drawing Sheets

HYBRID VEHICLE

This application is the national phase under 35 U.S.C. § 371 of PCT International Application No. PCT/JP01/08823 which has an International filing date of Oct. 5, 2001, which designated the United States of America.

FIELD OF THE INVENTION

The present invention relates to a hybrid vehicle including an internal combustion engine, an electric generator motor and a Rankine cycle system.

BACKGROUND ART

There are hybrid vehicles known from Japanese Patent Application Laid-open Nos. 5-340241 and 56-101012, wherein a heat energy of an exhaust gas from an internal combustion engine is converted into a mechanical energy in a Rankine cycle system, and a driving force for the vehicle is assisted by the mechanical energy, or a generator is driven by the mechanical energy to provide an electric power.

There is also a conventionally known hybrid vehicle including an internal combustion engine and an electric generator motor, wherein a driving force from the internal combustion engine is assisted by a driving force from the electric generator motor during acceleration and cruising of the vehicle, and a battery is charged by a regenerative electric power of electric generator motor during deceleration of the vehicle.

It should be noted here that when a Rankine cycle system is mounted on a vehicle, a heat energy of an exhaust gas from an internal combustion engine can be recovered during acceleration and cruising of the vehicle, but there is a problem that a kinetic energy of a vehicle body cannot be recovered in the Rankine cycle system during deceleration of the vehicle. In a hybrid vehicle, a kinetic energy of a vehicle body can be recovered as a regenerative electric power of an electric generator motor during deceleration of the vehicle, but there is also a problem that a heat energy of an exhaust gas from an internal combustion engine cannot be recovered during acceleration and cruising of the vehicle.

DISCLOSURE OF THE INVENTION

The present invention has been accomplished with the above circumstances in view, and it is an object of the present invention to ensure that even when the vehicle is in any operational state, the energy recovery efficiency can be enhanced to the maximum to reduce the amount of fuel consumed in the internal combustion engine.

To achieve the above object, according to a first aspect and feature of the present invention, there is proposed a hybrid vehicle including an internal combustion engine for generating a driving force for traveling of the vehicle, an electric generator motor for generating a driving force for traveling of the vehicle by an electric power from an accumulating means and for generating an electric power for charging the accumulating means, and a Rankine cycle system which is operated by a waste heat from the internal combustion engine during operation of the internal combustion engine to generate a driving force for traveling of the vehicle.

With the above arrangement, in the hybrid vehicle including the internal combustion engine and the electric generator motor, the Rankine cycle system operated by the waste heat from the internal combustion engine during operation of the internal combustion engine to generate the driving force for traveling of the vehicle is mounted. Therefore, it is possible not only to charge the accumulating means by an energy recovered by the regenerative braking provided by the electric generator motor during deceleration of the vehicle, but also to conduct the recovery of the energy by the Rankine cycle system even during acceleration and cruising of the vehicle incapable of conducting the regenerative braking. Thus, the driving force from the internal combustion engine can be assisted by the driving force from the electric generator motor operated by the electric power from the accumulating means and the driving force from the Rankine cycle system to reduce the amount of fuel consumed.

According to a second aspect and feature of the present invention, there is proposed a hybrid vehicle including an internal combustion engine for generating a driving force for traveling of the vehicle, an electric generator motor for generating a driving force for traveling of the vehicle by an electric power from an accumulating means and for generating an electric power for charging the accumulating means, and a Rankine cycle system which is operated by a waste heat from the internal combustion engine during operation of the internal combustion engine to generate an electric power for charging the accumulating means.

With the above arrangement, in the hybrid vehicle including the internal combustion engine and the electric generator motor, the Rankine cycle system operated by the waste heat from the internal combustion engine during operation of the internal combustion engine to generate the electric power for charging the accumulating means is mounted. Therefore, it is possible not only to charge the accumulating means by an energy recovered by the regenerative braking provided by the electric generator motor during deceleration of the vehicle, but also to charge the accumulating means by an energy recovered by the Rankine cycle system even during acceleration and cruising of the vehicle incapable of conducting the regenerative braking. Thus, the driving force from the internal combustion engine can be assisted by the driving force from the electric generator motor operated by the electric power from the accumulating means to reduce the amount of fuel consumed.

According to a third aspect and feature of the present invention, in addition to the second feature, the Rankine cycle system generates the electric power for charging the accumulating means, when the electric generator motor does not generate the electric power.

With the above arrangement, the Rankine cycle system generate the electric power for charging the accumulating means during acceleration and cruising of the vehicle during which the electric generator motor cannot generate the regenerative electric power. Therefore, it is possible to charge the accumulating means in all of states during acceleration, cruising and deceleration of the vehicle, thereby utilizing the performance of the electric generator motor sufficiently usefully.

A battery 8 in each of embodiments corresponds to the accumulating means of the present invention, and each of an electric generator motor 2 in the first embodiment and an electric generator motor 2a in the second embodiment corresponds to the electric generator motor of the present invention.

BRIEF DESCRIPTION OF THE DRAWINGS

FIG. 1 is a diagram showing the entire arrangement of a hybrid vehicle;

FIG. 2 is a diagram showing the arrangement of a Rankine cycle system;

FIG. 3 is a flow chart of a main routine;

FIG. 4 is a flow chart of a during-stoppage processing routine;

FIG. 5 is a flow chart of a during-acceleration processing routine;

FIG. 6 is a flow chart of a during-cruising processing routine;

FIG. 7 is a flow chart of a during-deceleration processing routine;

FIG. 8 is a diagram showing a map for judging the stoppage, acceleration, cruising and deceleration of the vehicle;

FIG. 9 is a diagram showing a map for judging a motor-assisting region, an internal combustion engine travel region and a charging region;

FIG. 10 is a diagram showing various threshold values in a charged state of a battery;

FIG. 11 is a diagram showing a map for judging the internal combustion engine travel region, a motor travel region and the charging region;

FIG. 12 is a time chart showing one example of a travel pattern for the vehicle;

FIG. 13 a time chart showing another example of the travel pattern for the vehicle.

BEST MODE FOR CARRYING OUT THE INVENTION

A first embodiment of the present invention will now be described with reference to FIGS. 1 to 13.

Figure 1:
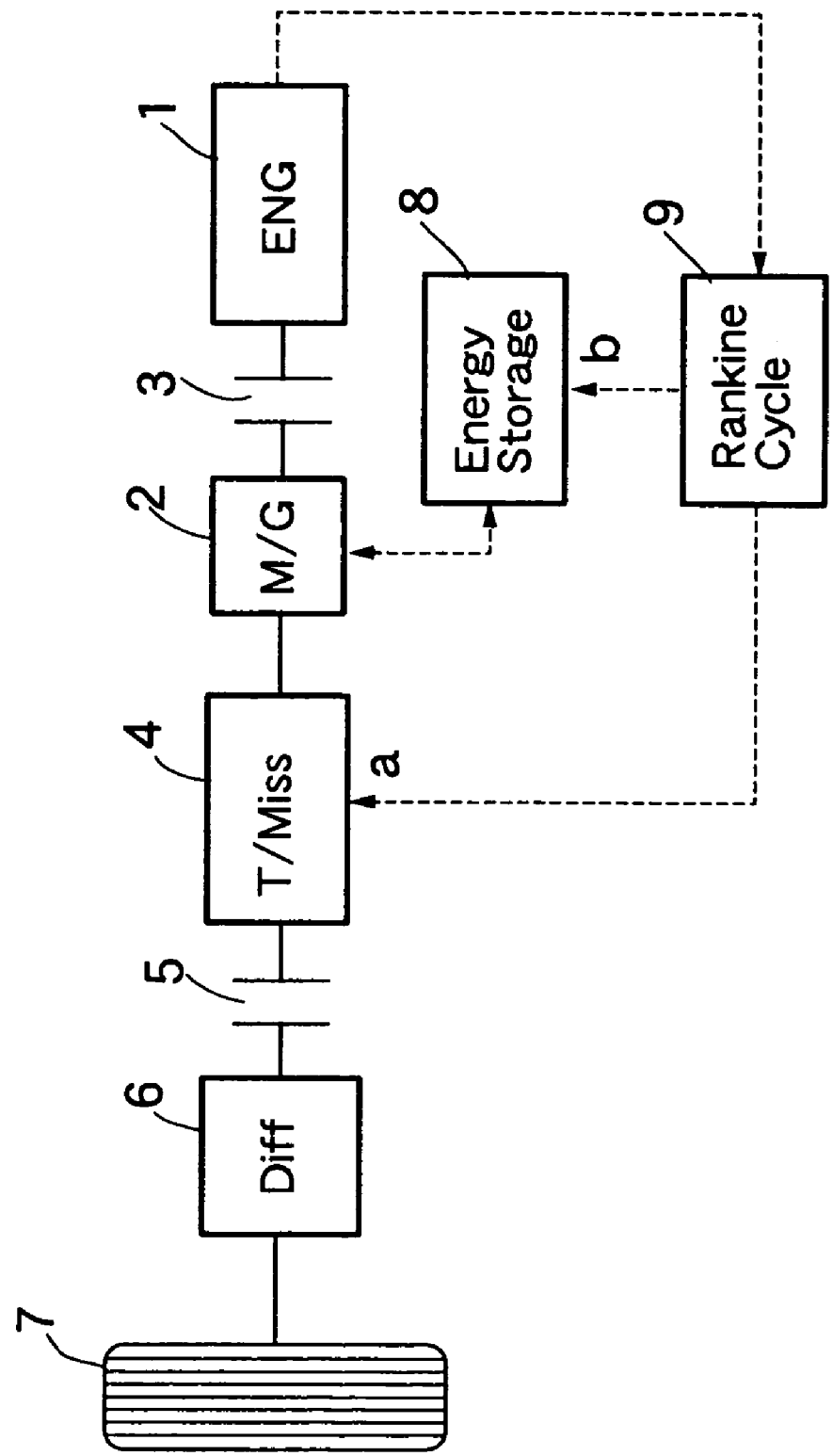
FIGS. 1 to 13 show a first embodiment of the present invention.

Referring to FIG. 1, a hybrid vehicle includes an internal combustion engine 1 for generating a driving power for traveling of the vehicle. The internal combustion engine 1 and an electric generator motor 2 are connected in line to each other through a clutch 3. Further, the electric generator motor 2 is connected to a driven wheel 7 through a transmission 4, a clutch 5 and a differential 6. Therefore, if the internal combustion engine 1 is driven in an engaged state of the clutch 3, a driving force generated by the internal combustion engine 1 is transmitted through the clutch 3, the electric generator motor 2, the transmission 4, the clutch 5 and the differential 6 to the driven wheel 7 to allow the vehicle to travel. At this time, the electric generator motor 2 may be raced, but if the electric generator motor 2 is driven by an electric power from a battery 8, the driving force from the internal combustion engine 1 can be assisted by a driving force generated by the electric generator motor 2, or if the electric generator motor 2 is driven by the driving force from the internal combustion engine 1 to function as a generator, the battery 8 can be charged. If the electric generator motor 2 is driven by a driving force transmitted back from the driven wheel 7 by releasing the engaged state of the clutch 3 during deceleration of the vehicle, the battery 8 can be charged by a regenerative electric power generated by the electric generator motor 2.

The vehicle includes a Rankine cycle system 9 operated by a waste heat from the internal combustion engine 1, and a driving force output by the Rankine cycle system 9 is input to the transmission 4 (see an arrow a). The transmission 4 unites the driving force generated by the Rankine cycle system 9 and the driving force generated by the internal combustion engine 1 or by the electric generator motor 2 with each other, for example, using a planetary gear mechanism to transmit the united driving forces to the driven wheel 7.

Figure 2:
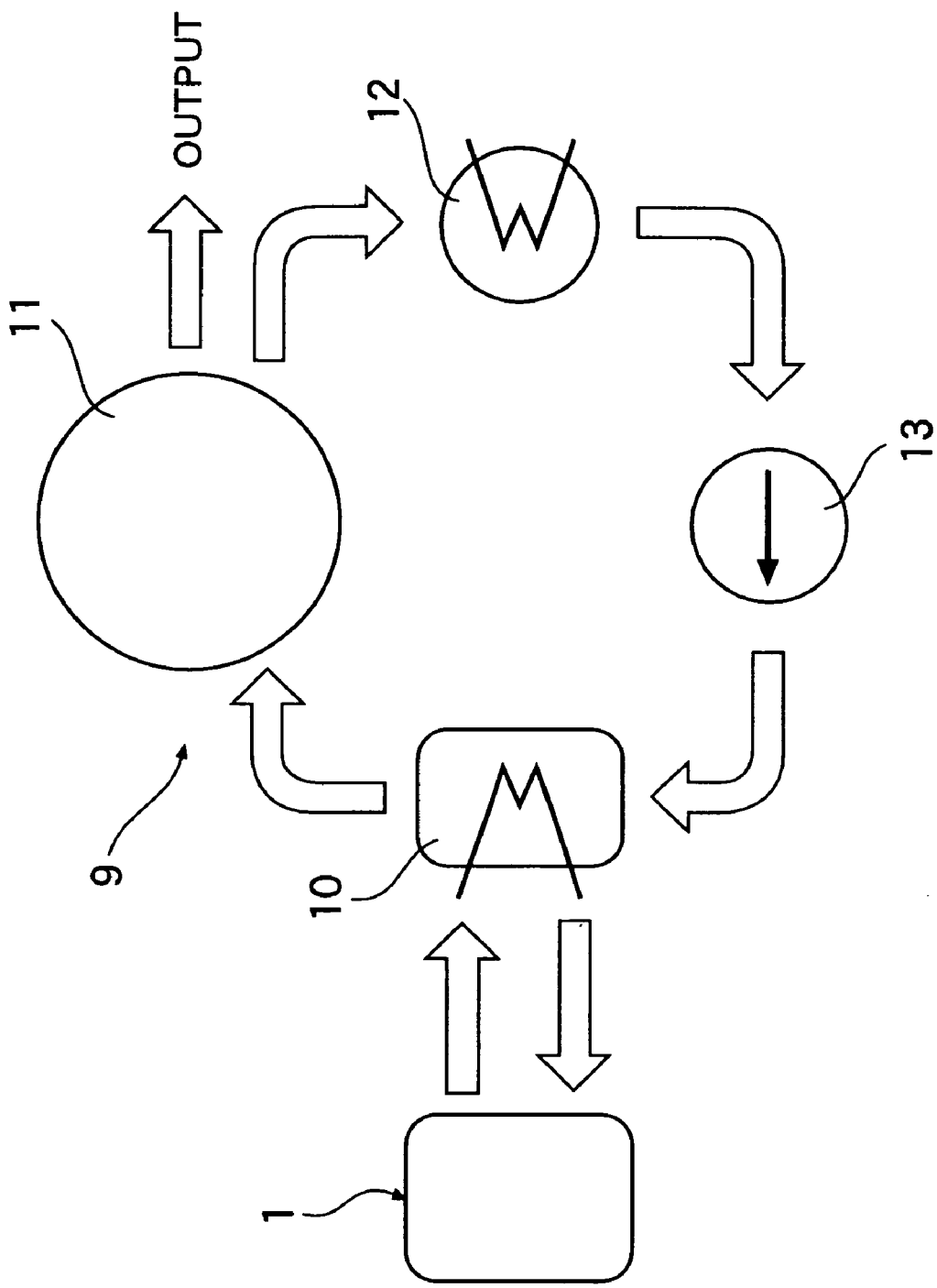

As shown in FIG. 2, the Rankine cycle system 9 has a known structure and includes an evaporator 10 for generating a high-temperature and high-pressure vapor using the waste heat from the internal combustion engine 1, e.g., an exhaust gas as a heat source, an expander 11 for generating a shaft output by the expansion of the high-temperature and high-pressure vapor, a condenser 12 for condensing a dropped-temperature and dropped-pressure vapor discharged from the expander 11 back to water, and a water supply pump 13 for supplying the water from the condenser 12 to the evaporator 10.

The control of the internal combustion engine 1, the electric generator motor 2 and the Rankine cycle system 9 will be described below with reference to flow charts. The internal combustion engine 1, the electric generator motor 2 and the Rankine cycle system 9 are controlled by an electronic control unit, based on output signals from a vehicle speed sensor, a vehicle body acceleration sensor, a throttle opening degree sensor, a battery voltage sensor, a battery current sensor and the like.

Figure 3:
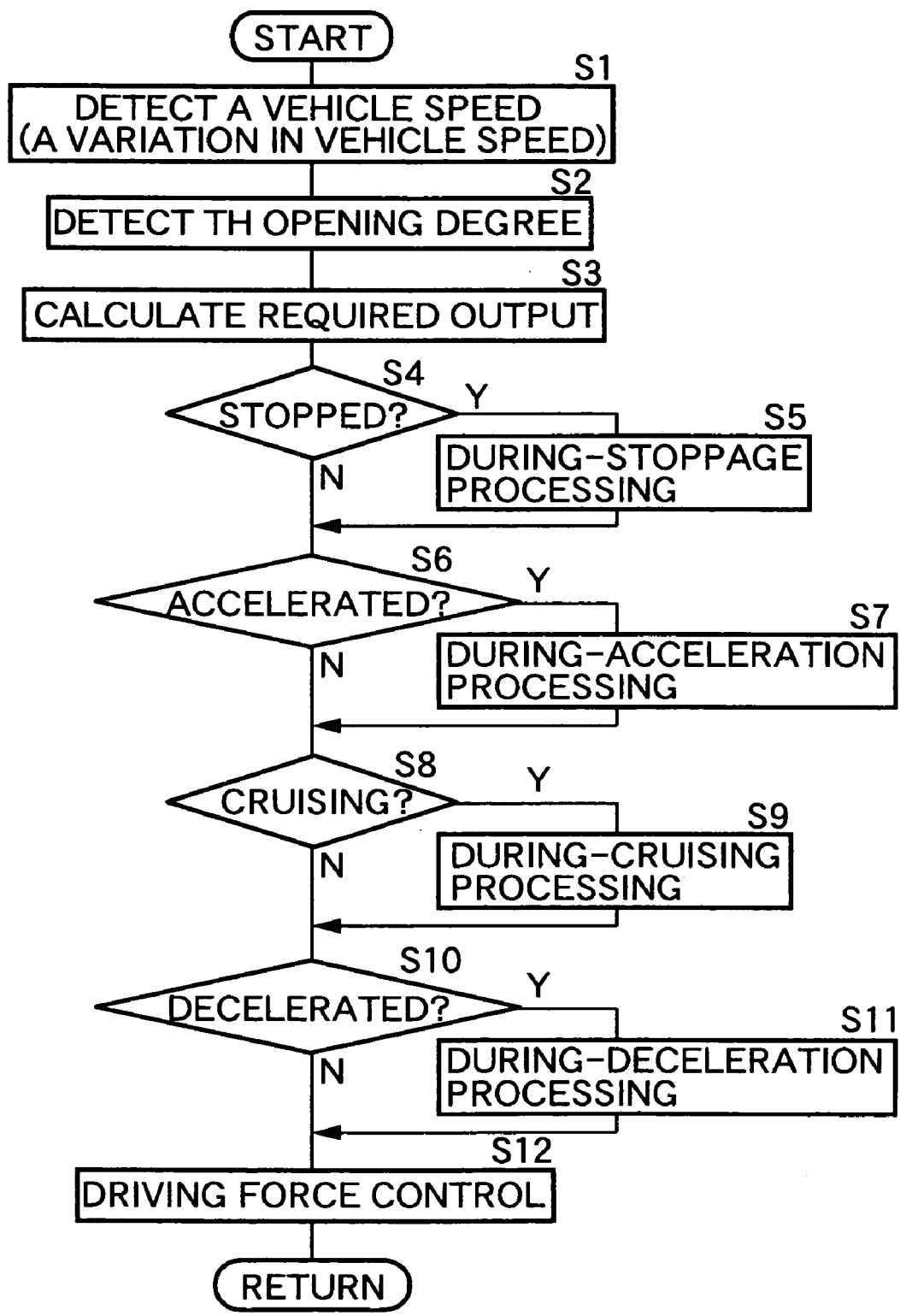

First, a vehicle speed and a variation in vehicle speed (an acceleration and deceleration of a vehicle body) are detected at Step S1 of a main routine in FIG. 3, and a throttle opening degree is detected at Step S2. A required output for the vehicle is calculated from the vehicle speed and the throttle opening degree at Step S3. If the vehicle is in a stopped state at Step S4, a during-stoppage processing which will be described hereinafter is carried out at Step S5. If the vehicle is in an accelerated state at Step S6, a during-acceleration processing which will be described hereinafter is carried out at Step S7. If the vehicle is in a cruising state at Step S8, a during-cruising processing which will be described hereinafter is carried out at Step S9. If the vehicle is in a decelerated state at Step S10, a during-deceleration processing which will be described hereinafter is carried out at Step S11. The control of the driving forces from the internal combustion engine 1, the electric generator motor 2 and the Rankine cycle system 9 corresponding to each of the during-stoppage processing, the during-acceleration processing, the during-cruising processing and the during-deceleration processing is carried out at Step S12.

Figure 8:
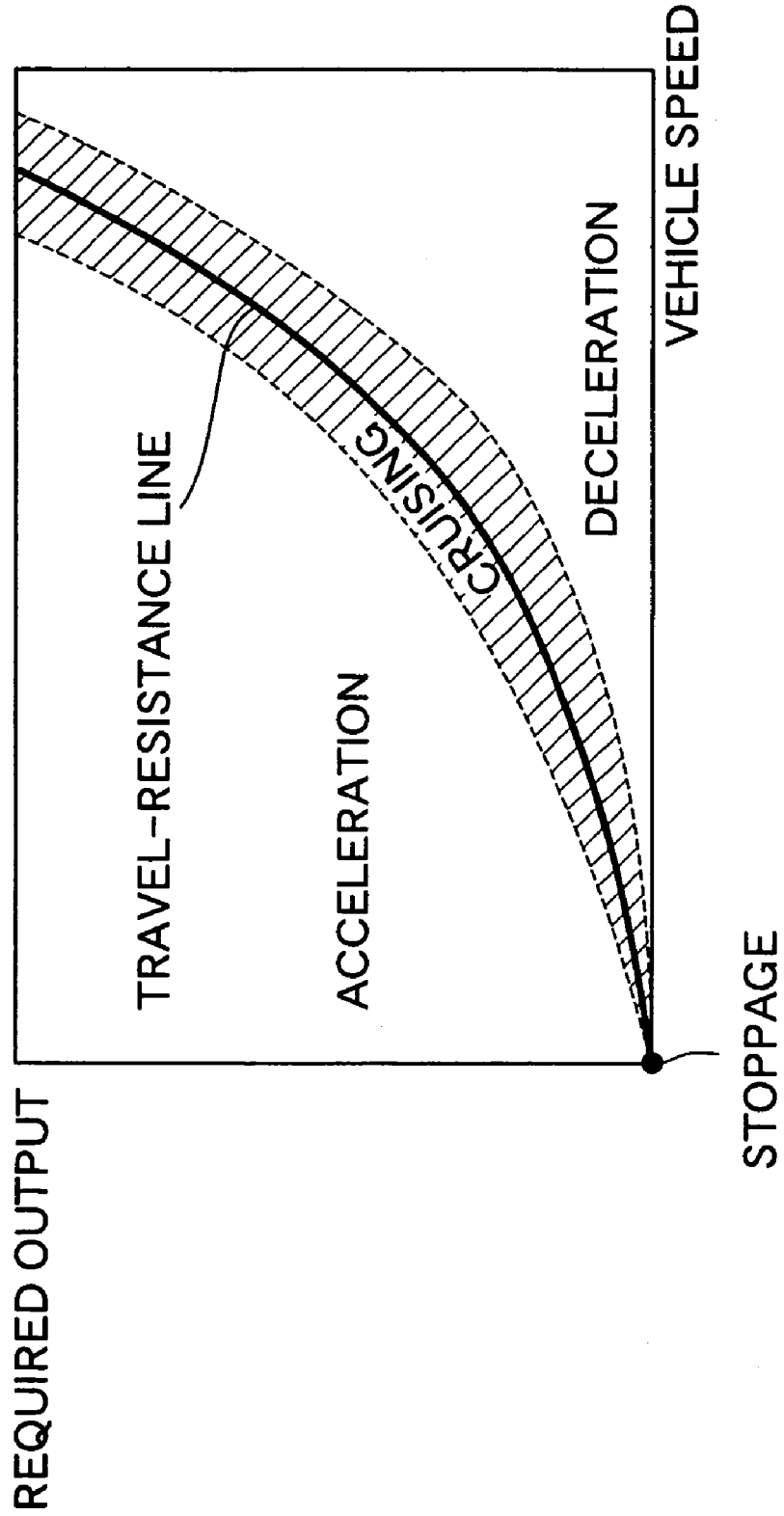

Whether the vehicle is in which of the stopped state, the accelerated state, the cruising state and the decelerated state is determined based on a map shown in FIG. 8. The map shown in FIG. 8 is made with the vehicle speed taken as an axis of abscissas and the required output taken as an axis of ordinates, and a travel-resistance parabolic line is established in the map. If both of the vehicle speed and the required output are 0 (zero), it is determined that the vehicle is in the stopped state. If the vehicle speed and the required output are in an obliquely lined region near to the travel-resistance parabolic line, it is determined that the vehicle is in the cruising state. If the vehicle speed and the required output are above the obliquely lined region, it is determined that the vehicle is in the accelerated state. If the vehicle speed and the required output are below the obliquely lined region, it is determined that the vehicle is in the decelerated state. Besides the map, for example, if the vehicle speed is substantially constant on an accent load, it is considered that the vehicle is in the accelerated state, and if the vehicle speed is substantially constant on a decent load, it is considered that the vehicle is in the decelerated state. If the absolute values of the acceleration or deceleration of the vehicle body are equal to or smaller than a predetermined value, it is considered that the vehicle is in the cruising state.

Figure 4:
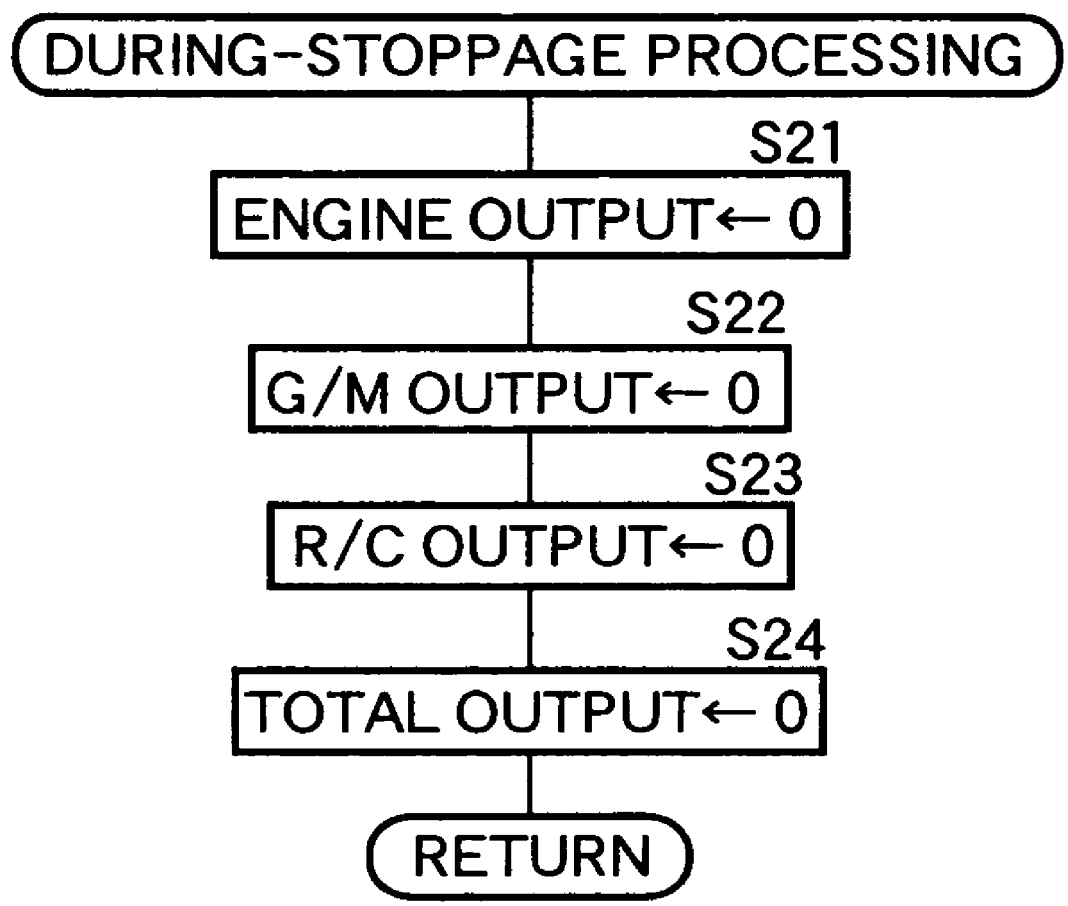

A subroutine of the Step S5 (the during-stoppage processing) will be described below with reference to a flow chart shown in FIG. 4.

First, the output from the internal combustion engine 1 is set at 0 (stoppage) at Step S21, and the output from the electric generator motor 2 is set at 0 at Step S22. In addition, the output from the Rankine cycle system 9 is set at 0 at Step 23, whereby the total output from the internal combustion engine 1, the electric generator motor 2 and the Rankine cycle system 9 is set at 0 at Step S24. By stopping all of the internal combustion engine 1, the electric generator motor 2 and the Rankine cycle system 9 during stoppage of the vehicle in this manner, the amount of fuel consumed can be reduced. To restart the stopped internal combustion engine 1, the electric generator motor 2 is used as a starter motor.

A subroutine of the Step S7 (the during-acceleration control) will be described below with reference to a flow chart shown in FIG. 5.

Figure 9:
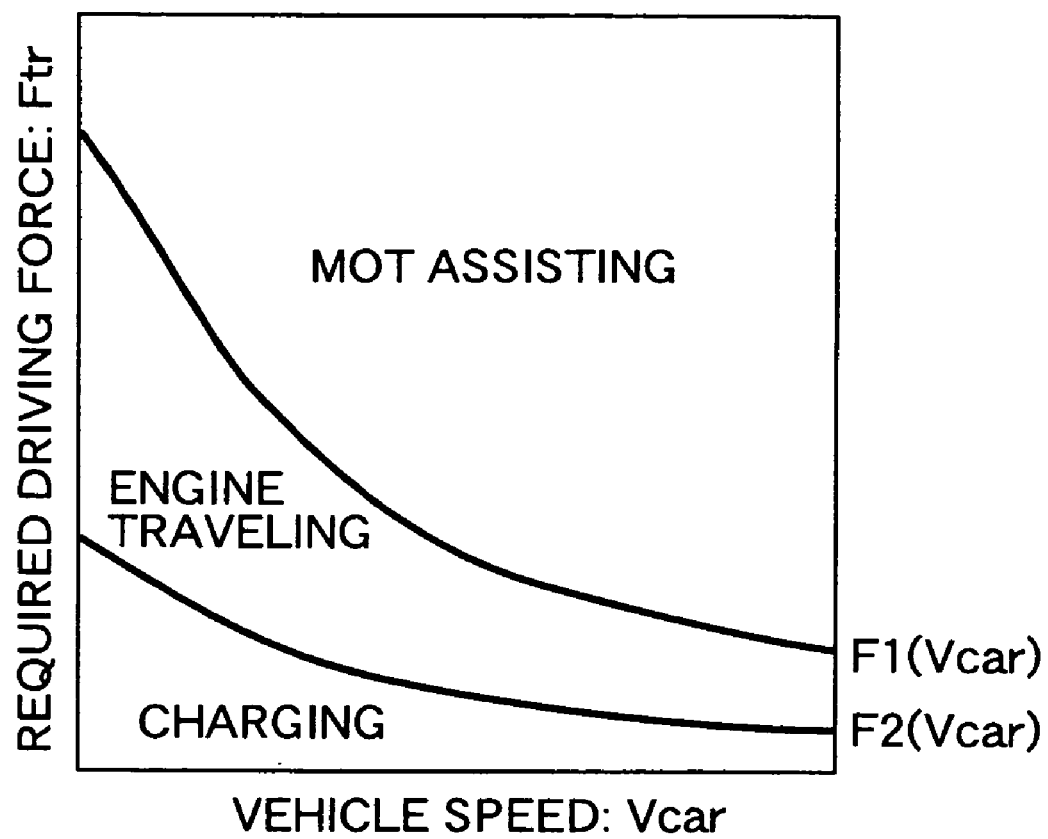

First, a required driving force Ftr for the vehicle is calculated from the vehicle speed and the throttle opening degree at Step S31, and a remaining capacity Esoc of the battery is calculated from the battery voltage and the battery current at Step S32. At subsequent Step S33, the required driving force Ftr is applied in a map shown in FIG. 9, and it is determined whether the current operational state is in a motor-assisting region or an internal combustion engine-traveling region or a charging region. The map in FIG. 9 is made with the vehicle speed Vcar taken as an axis of abscissas and the required driving force Ftr taken as an axis of ordinates, and a first threshold value F1 (Vcar) and a second threshold value F2 (Vcar) which are declined rightwards are set in this map. If the required driving force Ftr is equal to or larger than the first threshold value F1 (Vcar) at Step S33, it is determined that the current operational state is in the motor-assisting region, and an assist-permitting flag AST_FLG is set at "1" at Step S34.

Figure 10:
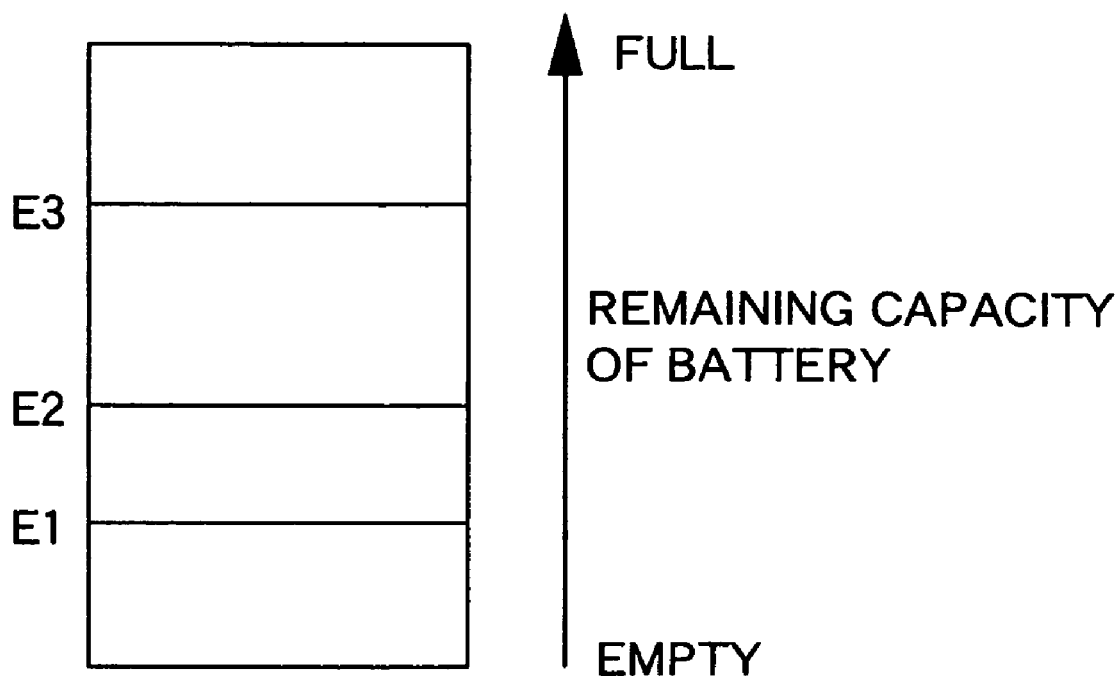

When the assist-permitting flag AST_FLG has been set at "1" at subsequent Step S35, namely, when the required driving force Ftr cannot be satisfied by only the internal combustion engine 1, if the remaining capacity Esoc of the battery is equal to or larger than the second threshold value E2 shown in FIG. 10 at Step S36, whereby the driving force from the electric generator motor 2 can be assisted, an assisting amount Pm to be generated in the electric generator motor 2 is determined by a map research in accordance with the required driving force Ftr and the vehicle speed Vcar at Step S37. If the remaining capacity Esoc of the battery is equal to or smaller than the first threshold value E1 shown in FIG. 10 at Step S38, whereby the driving force from the electric generator motor 2 cannot be assisted, the assisting amount Pm to be generated in the electric generator motor 2 is set at "0" and the assist-permitting flag AST_FLG is reset at "0" at Step S39.

If the required driving force Ftr is equal to or smaller than the second threshold value F2 (Vcar) shown in FIG. 9 at subsequent Step S40, it is determined that the operational state is in the charging region, and an electricity generation-permitting flag REG_FLG is set at "1" at Step S41.

When the electricity generation-permitting flag REG_FLG has been set at "1" at subsequent Step S42, if the remaining capacity Esoc of the battery is equal to or larger than the second threshold value E2 shown in FIG. 10 at Step S43, whereby the charging of the battery 8 is not required, the electricity generation amount Pm to be generated in the electric generator motor 2 is set at "0" and the electricity generation-permitting flag REG_FLG is reset at "0" at Step S44. If the remaining capacity Esoc of the battery is equal to or smaller than the first threshold value E1 shown in FIG. 10 at Step S45, whereby the charging of the battery 8 is required, the electricity generation amount Pm to be generated in the electric generator motor 2 is determined by the map research in accordance with the required driving force Ftr and the vehicle speed Vcar at Step S46.

At subsequent Step S47, a Rankine cycle output Prc which is an output from the Rankine cycle system 9 is calculated from the operational state of the internal combustion engine 1. At Step S48, the assisting amount Pm for the electric generator motor 2 (or a generation electricity amount Pm in the electric generator motor 2 which is a negative value) and the Rankine cycle output Prc are subtracted from the required driving force Ftr at Step S48 to provide a target internal combustion engine output Pe. At Step S49, a rotational speed Ne of the internal combustion engine 1 for providing the target internal combustion engine output Pe in the smallest amount of fuel consumed is calculated.

If the required driving force Ftr is large during acceleration of the vehicle, the driving force from the internal combustion engine 1 is assisted by the driving force from the electric generator motor 2 upon the condition that the remaining capacity Esoc of the battery is sufficient. If the required driving force Ftr is small during acceleration of the vehicle, the electric generator motor 2 is driven by the driving force from the internal combustion engine 1 to charge the battery 8 upon the condition that the battery 8 is not charged excessively. Therefore, the accelerating performance of the vehicle can be enhanced, and the battery 8 can be charged to provide for the cruising subsequent to the acceleration.

A subroutine of Step S9 (the during-cruising control) will be described below with reference to a flow chart shown in FIG. 6.

First, a required output Ptr for the vehicle is calculated from the vehicle speed and the throttle opening degree at Step S51, and a remaining capacity Esoc of the battery is calculated from the battery voltage and the battery current at Step S52. If the remaining capacity Esoc of the battery is equal to or larger than the second threshold value E2 shown in FIG. 10 at subsequent Step S53, it is determined that the traveling of the vehicle by the electric generator motor 2 can be achieved, and a discharge-permitting flag DCH_FLG is set at "1" at Step S54.

Figure 11:
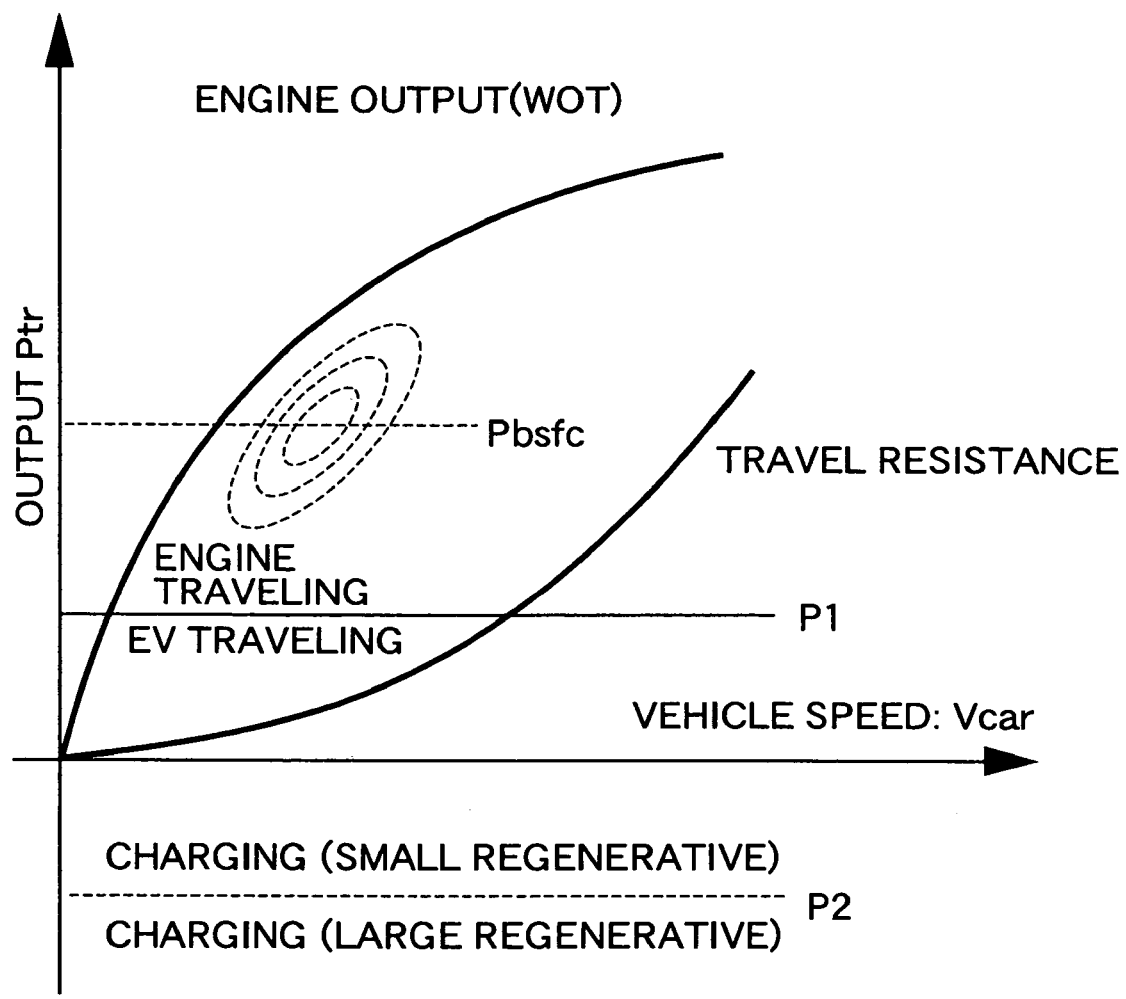

When the discharge-permitting flag DCH_FLG has been set at "1" at subsequent Step S55, if the required output Ptr is equal to or smaller than a threshold value P1 shown in FIG. 11 at Step S56, whereby the traveling of the vehicle can be achieved by only the output from the electric generator motor 2, a motor output Pm to be generated in the electric generator motor 2 is determined as the required output Ptr at Step S57. If the required output Ptr exceeds the threshold value P1 shown in FIG. 11 at Step S58, whereby the traveling of the vehicle cannot be achieved by only the output from the electric generator motor 2, the motor output Pm to be generated in the electric generator motor 2 is set based on the vehicle speed Vcar and the required output Ptr, and the a value resulting from the subtraction of the motor output Pm from the required output Ptr is determined as the target internal combustion engine output Pe at Step S59.

If the remaining capacity Esoc of the battery is smaller than the first threshold value E1 shown in FIG. 10 at subsequent Step S60, it is determined that the generation of electricity by the internal combustion engine 1 is required, and the electricity generation-permitting flag REG_FLG is set at "1" and the discharge-permitting flag DCH_FLG is reset at "0" at Step S61.

When the electricity generation-permitting flag REG_FLG has been set at "1" at subsequent Step S62, if the required output Ptr is smaller than a preset value Pbsfc (an output at the time when the efficient of the internal combustion engine 1 is the largest) shown in FIG. 11 at Step S63, the electricity generation amount Pm to be generated in the electric generator motor 2 is set at a value resulting from the subtraction of the required output Ptr from the preset value Pbsfc at Step S64, whereby the electric generator motor 2 is driven by the electricity generation amount Pm which is a portion of the preset value Pbsfc as the output from the internal combustion engine 1, thereby charging the battery 8. If the remaining capacity Esoc of the battery is larger than the second threshold value E2 shown in FIG. 10 at Step S65, whereby the charging of the battery 8 is not required, the electricity generation amount Pm to be generated in the electric generator motor 2 is set at "0" and the electricity generation-permitting flag REG_FLG is reset "0" at Step S66.

At subsequent Step S67, a Rankine cycle output Prc which is an output from the Rankine cycle system 9 is calculated from the operational state of the internal combustion engine 1. At Step S68, the motor output Pm from the electric generator motor 2 (or an electricity generation amount Pm in the electric generator motor 2 which is a negative value) and the Rankine cycle output Prc are subtracted from the required driving force Ftr at Step S68 to provide a target internal combustion engine output Pe. At Step S69, a rotational speed Ne of the internal combustion engine 1 for providing the target internal combustion engine output Pe in the smallest amount of fuel consumed is calculated.

In this way, when the remaining capacity Esoc of the battery is sufficient during cruising of the vehicle, if the required output Ptr is large, the vehicle is allowed to travel by both of the driving force from the internal combustion engine 1 and the driving force from the electric generator motor 2. If the required output Ptr is small, the internal combustion engine 1 is stopped, and the vehicle is allowed to travel by only the driving force from the electric generator motor 2. Therefore, it is possible to suppress the amount of fuel consumed to the minimum. When the remaining capacity Esoc of the battery is insufficient during cruising of the vehicle, the electric generator motor 2 can be driven by the driving force from the internal combustion engine 1 to charge the battery 8.

Figure 7:
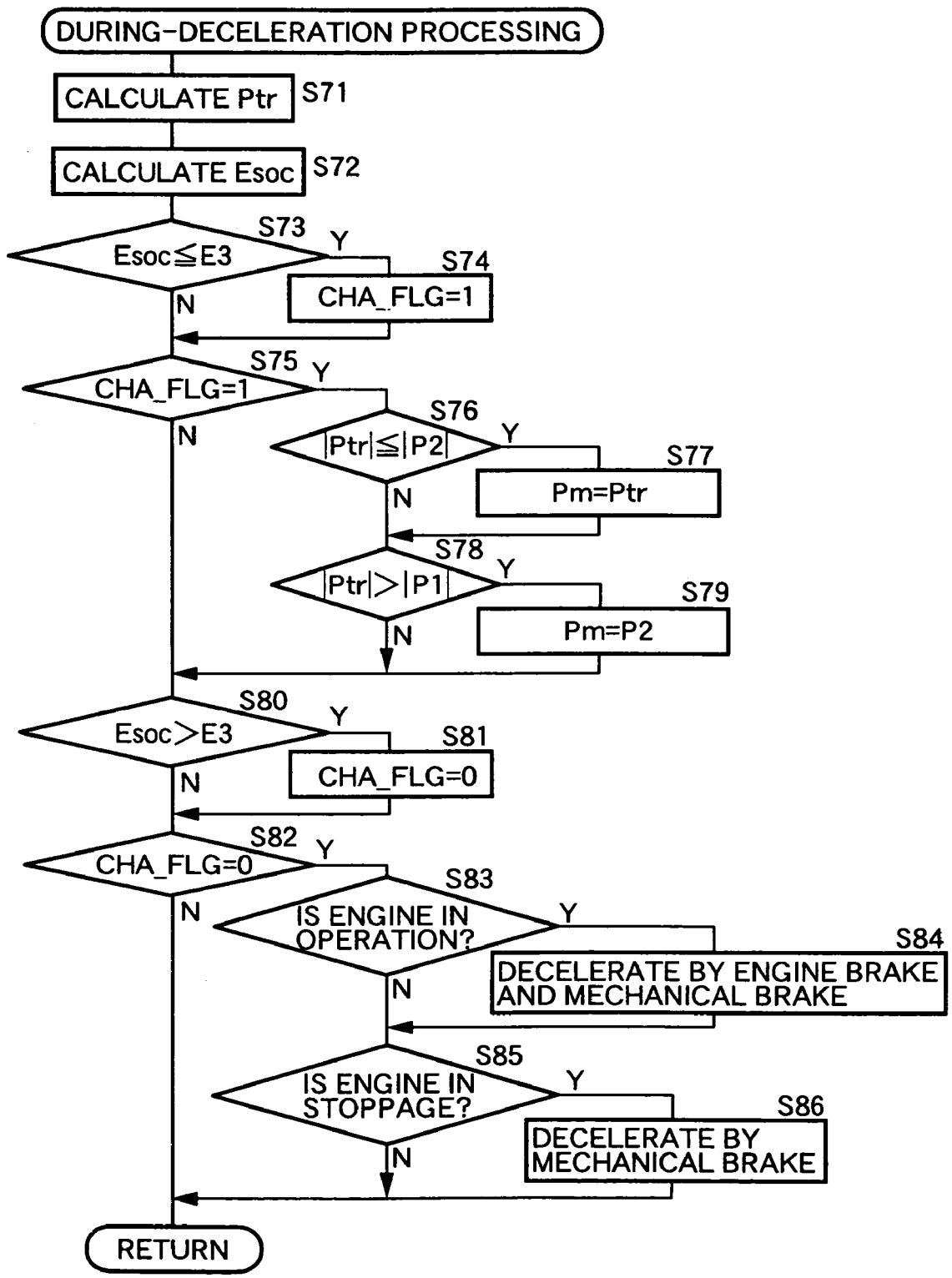

A subroutine of Step S11 (the during-deceleration control) will be described below with reference to a flow chart shown in FIG. 7.

First, at Step S71, a required output for the vehicle, namely, a required regenerative output Ptr is calculated from the vehicle speed and the throttle opening degree, and at Step S72, a remaining capacity Esoc of the battery is calculated from the battery voltage and the battery current. If the remaining capacity Esoc of the battery is equal to or smaller than a third threshold value E3 shown in FIG. 10 at subsequent Step S73, it is determined that the battery 8 can be charged by a regenerative electric power, and a charge-permitting flag CHA_FLG is reset at "1" at Step S74.

When the charge-permitting flag CHA_FLG has been set at "1" at subsequent Step S75, if the absolute value of the required regenerative output Ptr is equal to or smaller than the absolute value of a threshold value P2 shown in FIG. 11 at Step S76, the required regenerative output Ptr is determined, as it is, as a regenerative output Pm from the electric generator motor 2 at Step S77. If the absolute value of the required regenerative output Ptr exceeds the absolute value of the threshold value P2 shown in FIG. 11 at Step S78, the regenerative output Pm from the electric generator motor 2 is set at the threshold value P2 at Step S79.

If the remaining capacity Esoc of the battery exceeds the third threshold value E3 shown in FIG. 10 at subsequent Step S80, it is determined that the battery 8 cannot be further charged, and the charge-permitting flag CHA_FLG is reset at "0" at Step S81.

When the charge-permitting flag CHA_FLG has been reset at "0" at subsequent Step S82, if the internal combustion engine 1 is in operation at Step S83, the vehicle is decelerated by an engine brake and a mechanical brake without conduction of the regenerative braking at Step S84. If the internal combustion engine 1 is in stoppage at Step S85, the vehicle is decelerated by the mechanical brake at Step S86.

In this way, the regenerative braking is carried out by the electric generator motor 2 upon the condition that there is no possibility that the battery 8 might be charged excessively during deceleration of the vehicle, whereby the battery 8 might be charged by the regenerative electric power. If there is a possibility that the battery 8 is charged excessively, the regenerative braking is prohibited, and the vehicle is decelerated by the engine brake and the mechanical brake. Therefore, it is possible to ensure the remaining capacity Esoc of the battery to the maximum, while suppressing the amount of fuel consumed to the minimum.

Figure 12:
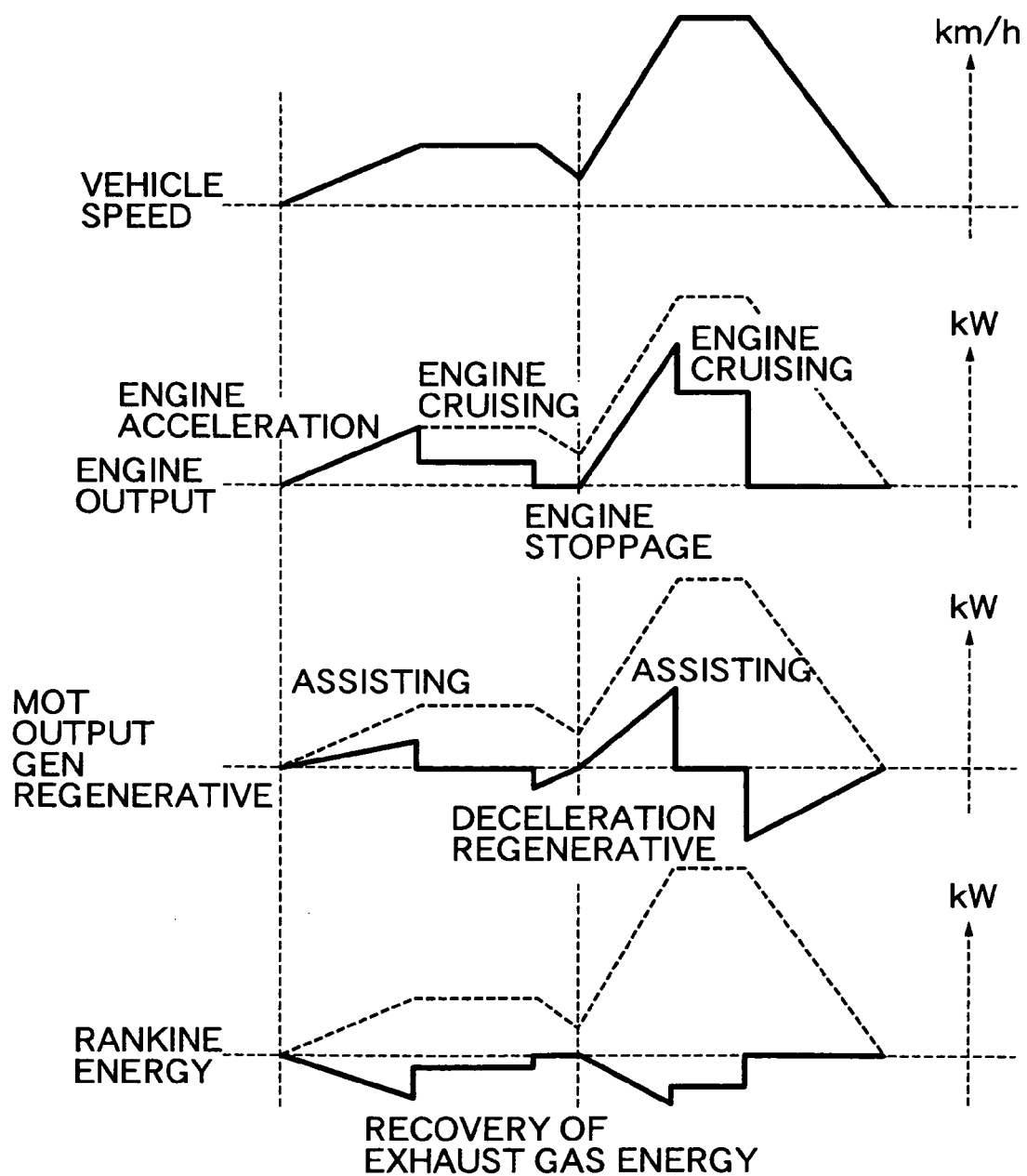

FIG. 12 shows one example of a travel pattern for the vehicle. During acceleration of the vehicle, the vehicle is allowed to travel by both of the driving force from the internal combustion engine 1 and the driving force from the electric generator motor 2. During cruising of the vehicle, the vehicle is allowed to travel by the driving force from the internal combustion engine 1. During deceleration of the vehicle, the internal combustion engine 1 is stopped, and the battery 8 is charged by the regenerative electric power from the electric generator motor 2. During operation of the internal combustion engine 1, the driving force from the internal combustion engine 1 is assisted by the output from the Rankine cycle system 9.

Figure 13:
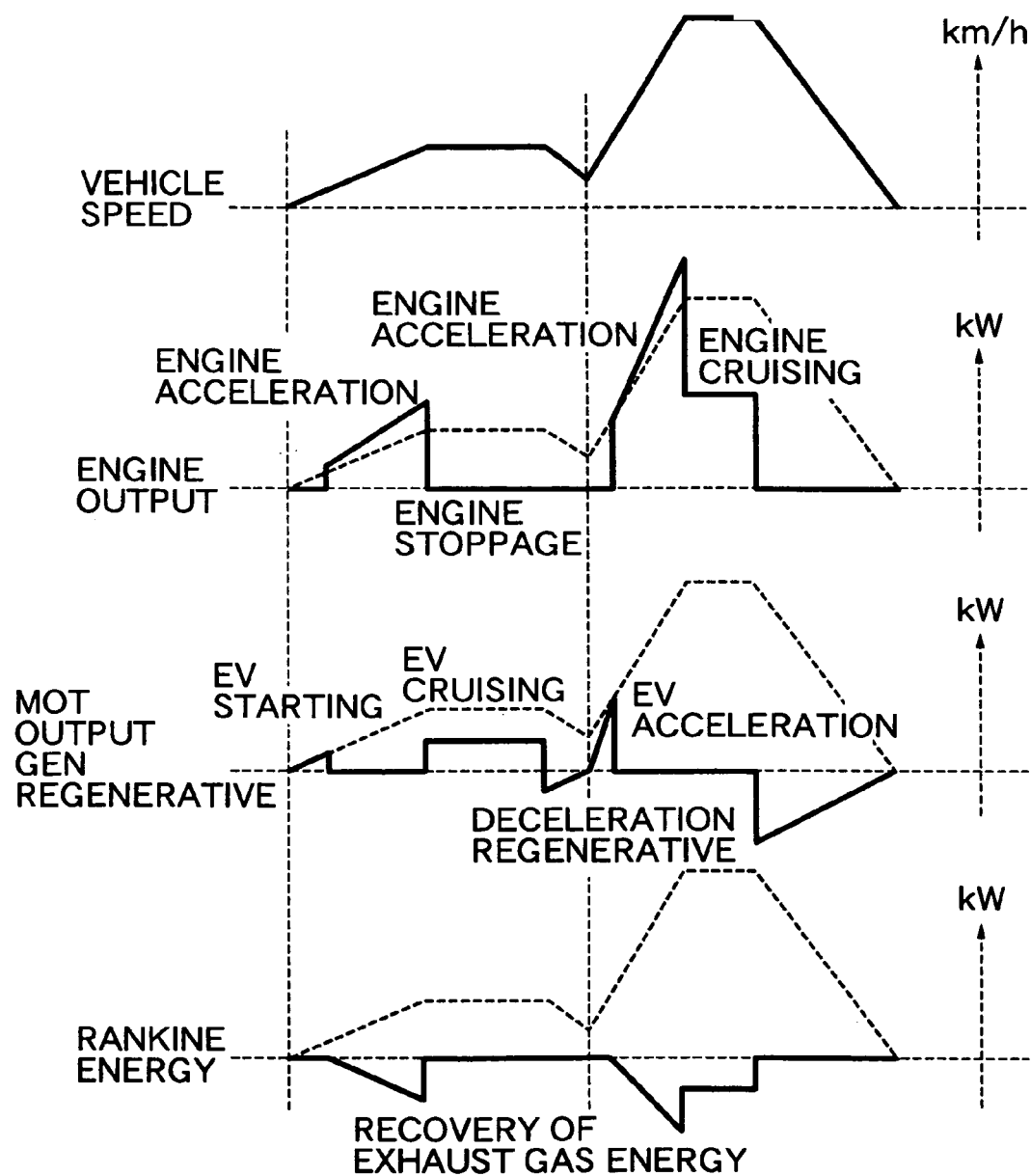

FIG. 13 shows another example of the travel pattern for the vehicle. At the start of the vehicle, the electric generator motor 2 capable of outputting a large low-speed torque is used. During acceleration of the vehicle, the vehicle is allowed to travel by the driving force from the internal combustion engine 1. During cruising of the vehicle, the vehicle is allowed to travel by the driving force from the electric generator motor 2. During deceleration of the vehicle, the internal combustion engine 1 is stopped, and the battery 8 is charged by the regenerative electric power from the electric generator motor 2. During operation of the internal combustion engine 1, the driving force from the internal combustion engine 1 is assisted by the output from the Rankine cycle system 9.

A second embodiment of the present invention will now be described with reference to FIG. 14.

The electric generator motor 2 is mounted between the internal combustion engine 1 and the transmission 4 in the first embodiment shown in FIG. 1, but in the second embodiment, a first electric generator motor 2a driven by a battery 8 is connected to the differential 6, and a second electric generator motor 2b driven by the battery 8 is connected to the internal combustion engine 1. The first electric generator motor 2a is used for the traveling of the vehicle by only a driving force from the first electric generator motor 2a, the assisting of the driving force from the internal combustion engine 1 and the generation of the regenerative electric power. The second electric generator motor 2b is used for the starting of the internal combustion engine 1 and the generation of electricity by the driving force from the internal combustion engine 1. Even in the present embodiment, the driving force output from the Rankine cycle system 9 is input to the transmission 4 through a driving force-uniting means such as a planetary gear mechanism, as in the above-described first embodiment (see an arrow a).

Although the embodiments of the present invention have been described in detail, it will be understood that the present invention is not limited to the above-described embodiments, and various modifications in design may be made.

Figure 14:
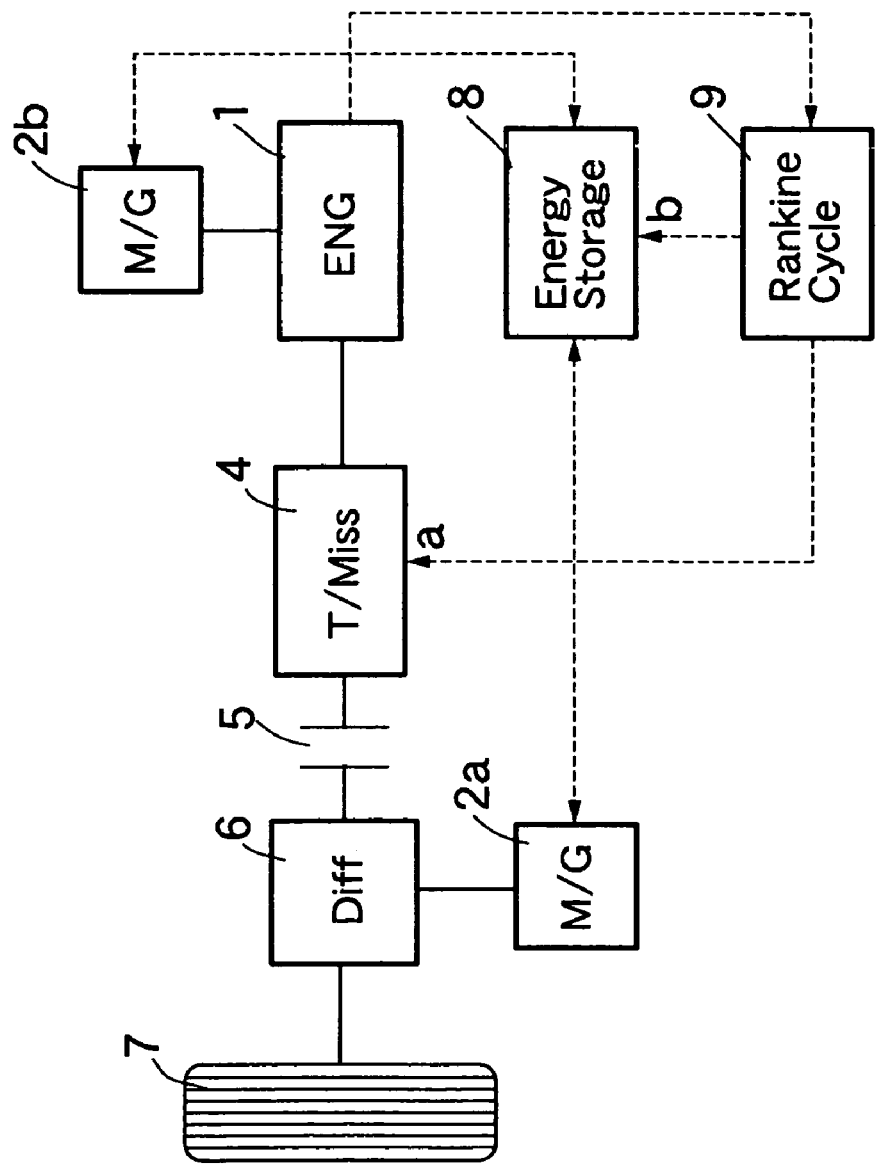
FIG. 14 is a diagram showing the entire arrangement of a hybrid vehicle according to a second embodiment of the present invention.

For example, in the already described embodiments, the shaft output from the Rankine cycle system 9 is used directly as a drive source for traveling of the vehicle, as shown by the arrow a in FIGS. 1 and 14, but a generator (not shown) can be driven by the shaft output from the Rankine cycle system 9. An electric power generated by the generator is charged in the battery 8, as shown by an arrow b and used for the driving of the electric generator motor 2, 2a, 2b. During acceleration and cruising of the vehicle, the regenerative electric power cannot be generated by the electric generator motor 2, 2a, but the battery 8 can be charged by the electric power generated by the Rankine cycle system 9 at that time, and thus, during all of acceleration, cruising and deceleration of the vehicle, the battery 8 can be charged by the electric power generated by the Rankine cycle system 9 or the regenerative electric power generated by the electric generator motor 2, 2a without use of the driving force from the internal combustion engine 1, whereby the performance of the electric generator motor 2, 2a, 2b can be utilized sufficiently usefully. In this embodiment, the output corresponding to the Rankine cycle output Prc in each of the first and second embodiments is output as a motor output Pm by the electric generator motor 2.

Figure 5:
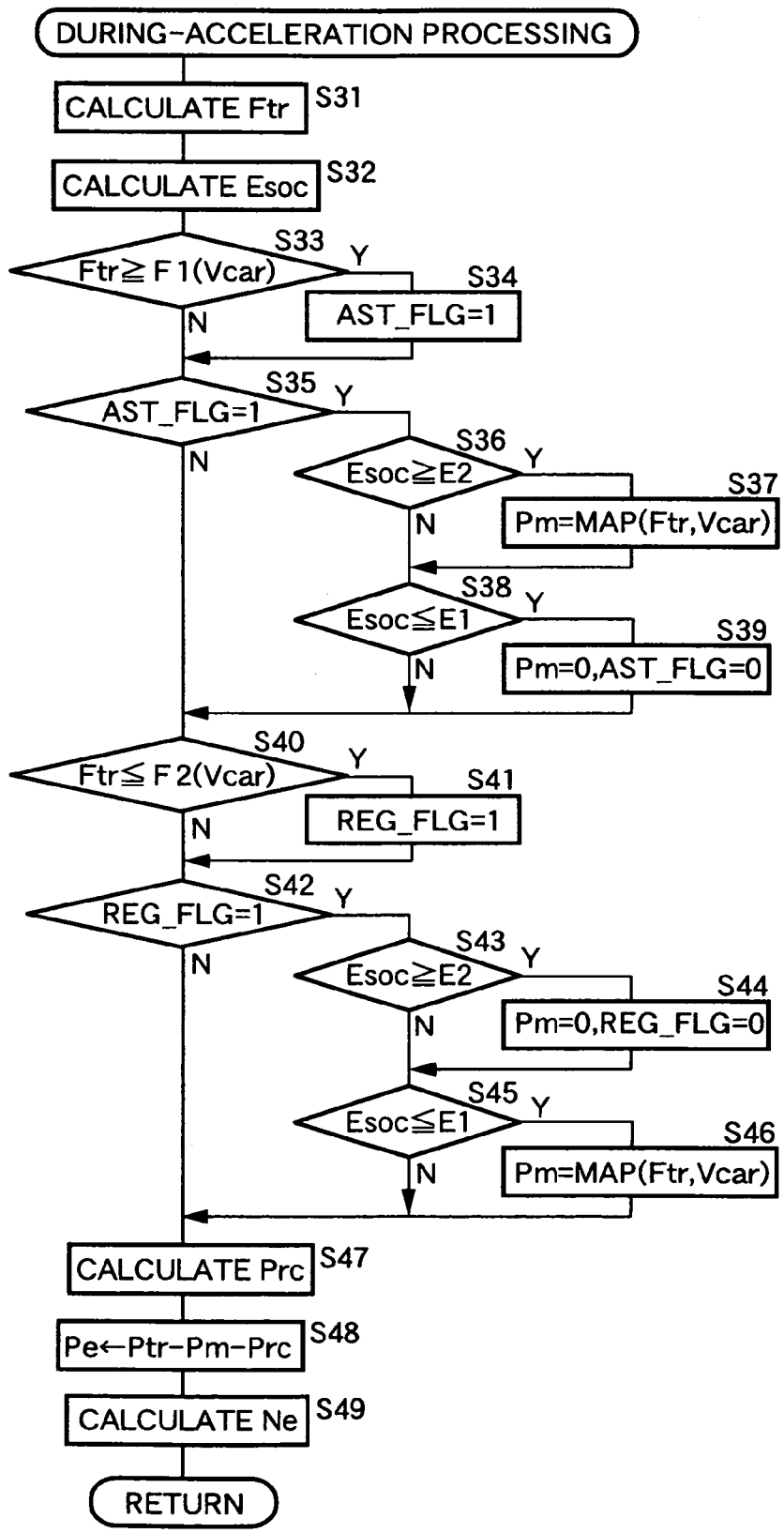
Figure 6:
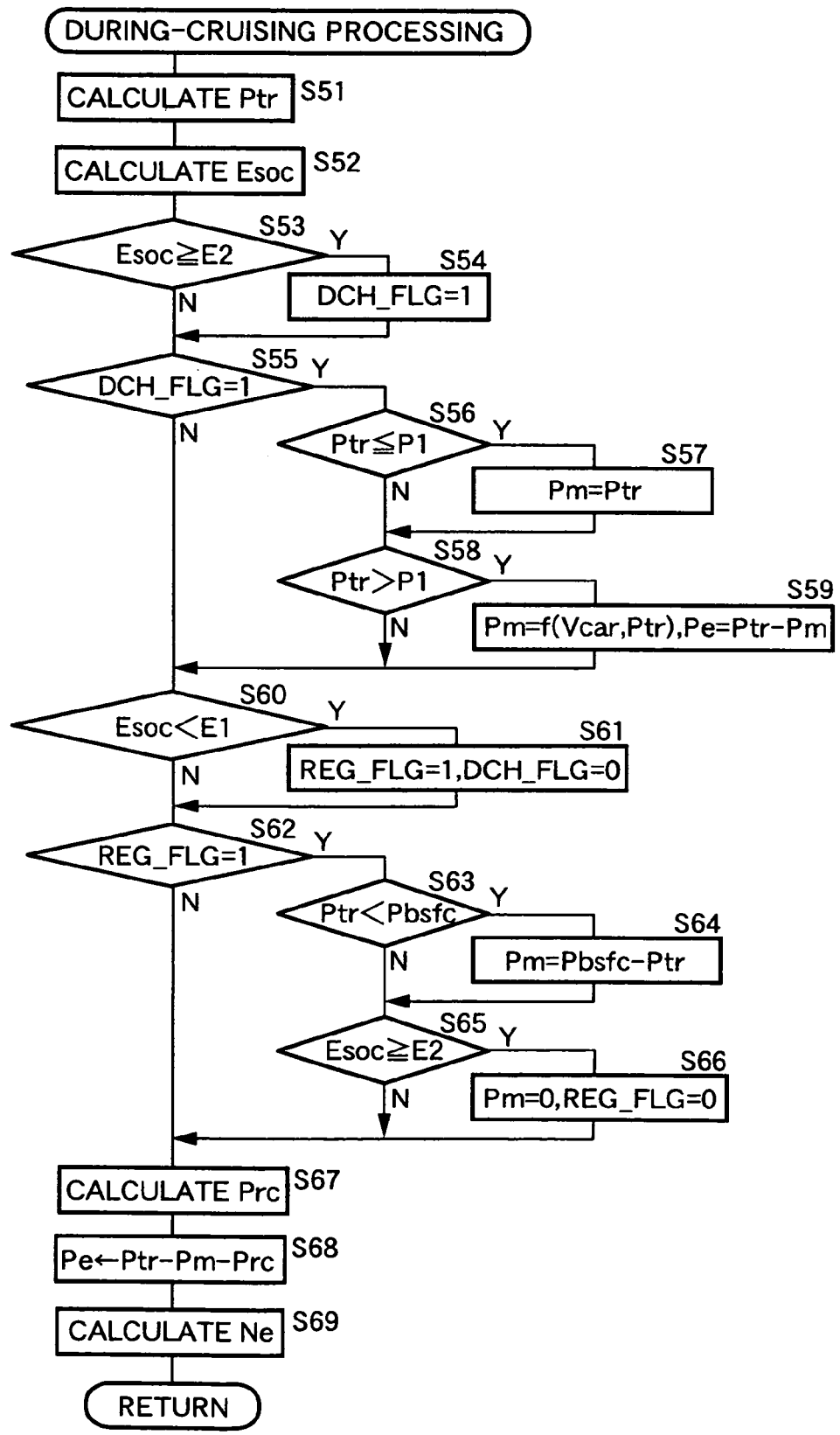

In place of the during-acceleration processing shown in FIG. 5, the during-cruising processing shown in FIG. 6 can be employed.

The battery 8 has been illustrated as an accumulating means in each of the embodiments, but a capacitor may be used in place of the battery 8.

INDUSTRIAL APPLICABILITY

As discussed above, the present invention is applicable to an existing hybrid vehicle including an internal combustion engine and an electric generator motor, and it is possible to provide a further enhancement in energy recovery efficiency and a reduction in amount of fuel consumed by adding a Rankine cycle system to the hybrid vehicle.

What is claimed is:

1. A hybrid vehicle including
an internal combustion engine for generating a first driving force for traveling of the vehicle,
an electric generator motor for generating a second driving force for traveling of the vehicle by an electric power from an accumulator and for generating an electric power for charging said accumulator,
a Rankine cycle system which is operated by a waste heat from said internal combustion engine during operation of said internal combustion engine to generate a third driving force for traveling of the vehicle,
a transmission leading to a wheel of the vehicle, and
wherein said internal combustion engine and said Rankine cycle system are arranged in parallel to each other and each is connected to the transmission, at least the Rankine cycle system being directly connected to said transmission.

2. A hybrid vehicle including
an internal combustion engine for generating a first driving force for traveling of the vehicle,
an electric generator motor for generating a second driving force for traveling of the vehicle by an electric power from an accumulator and for generating an electric power for charging said accumulator,
a Rankine cycle system which is operated by a waste heat from said internal combustion engine during operation of said internal combustion engine to generate an electric power for charging said accumulator,
a transmission leading to a wheel of the vehicle, and
wherein said internal combustion engine and said Rankine cycle system are arranged in parallel to each other and each is connected to the transmission, at least the Rankine cycle system being directly connected to said transmission.

3. The hybrid vehicle according to claim 2, wherein said Rankine cycle system generates the electric power for charging said accumulator, when said electric generator motor does not generate the electric power.

4. The hybrid vehicle according to claim 1, wherein the accumulator is a battery.

5. The hybrid vehicle according to claim 2, wherein the accumulator is a battery.

6. The hybrid vehicle according to claim 1, wherein the accumulator is a capacitor.

7. The hybrid vehicle according to claim 2, wherein the accumulator is a capacitor.

8. A hybrid vehicle including
an internal combustion engine for generating a driving force for traveling of the vehicle,
an electric generator motor for generating a driving force for traveling of the vehicle by an electric power from an accumulator and for generating an electric power for charging said accumulator,
a Rankine cycle system which is operated by a waste heat from said internal combustion engine during operation of said internal combustion engine to generate an electric power for charging said accumulator, and
a transmission leading to a wheel of the vehicle,
wherein said internal combustion engine and said Rankine cycle system are arranged in parallel to each other, and
wherein said electric generator motor is interposed between said internal combustion engine and said transmission, the internal combustion engine and the electric generator motor connecting to the transmission separately from the Rankine cycle system.

9. A hybrid vehicle including
an internal combustion engine for generating a driving force for traveling of the vehicle,
an electric generator motor for generating another driving force for traveling of the vehicle by an electric power from an accumulator and for generating an electric power for charging said accumulator,
a Rankine cycle system which is operated by a waste heat from said internal combustion engine during operation of said internal combustion engine to generate an electric power for charging said accumulator, and
a transmission leading to a wheel of the vehicle via said differential,
wherein said internal combustion engine and said Rankine cycle system are arranged in parallel to each other and each is connected to the transmission, at least the Rankine cycle system being directly connected to said transmission, and
wherein said electric generator motor is connected to said differential.

* * * * *